US011809841B1

(12) United States Patent
Zhang et al.

(10) Patent No.: US 11,809,841 B1
(45) Date of Patent: Nov. 7, 2023

(54) AUTOMATIC SOURCE CODE REFACTORING TO MITIGATE ANTI-PATTERNS

(71) Applicant: Amazon Technologies, Inc., Seattle, WA (US)

(72) Inventors: Jiangtao Zhang, Pleasanton, CA (US); Mark Fawaz, Laguna Hills, CA (US); Gunja Agrawal, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/118,361

(22) Filed: Dec. 10, 2020

(51) Int. Cl.
*G06F 8/33* (2018.01)
*G06N 20/00* (2019.01)
*G06F 9/54* (2006.01)

(52) U.S. Cl.
CPC .............. *G06F 8/33* (2013.01); *G06F 9/547* (2013.01); *G06N 20/00* (2019.01)

(58) Field of Classification Search
CPC ............ G06F 8/33; G06F 9/547; G06N 20/00
See application file for complete search history.

(56) References Cited

U.S. PATENT DOCUMENTS

| 8,566,787 | B2 * | 10/2013 | Maskeri Rama | ......... | G06F 8/72 717/109 |
|---|---|---|---|---|---|
| 10,705,837 | B2 | 7/2020 | Kadam | | |
| 10,956,242 | B1 | 3/2021 | Kumar | | |
| 10,986,013 | B1 * | 4/2021 | Theimer | ............. | G06F 11/3466 |
| 11,042,369 | B1 * | 6/2021 | Kimball | .............. | G06F 11/3466 |
| 11,150,880 | B1 * | 10/2021 | Parisa | ....................... | G06F 8/72 |

(Continued)

FOREIGN PATENT DOCUMENTS

| CN | 108647520 | A | * | 10/2018 | .......... G06F 11/3684 |
|---|---|---|---|---|---|
| CN | 112348663 | A | * | 2/2021 | |

OTHER PUBLICATIONS

Alon et al., "code2vec: Learning Distributed Representations of Code", Proc. ACM Program. Lang., vol. 3, No. POPL, Article 40, Jan. 2019, pp. 40:1-40:29.

(Continued)

*Primary Examiner* — Daxin Wu
(74) *Attorney, Agent, or Firm* — NICHOLSON DE VOS WEBSTER & ELLIOTT LLP

(57) ABSTRACT

Techniques are described for enabling the automatic refactoring of software application source code to mitigate identified anti-patterns and other software modernization-related issues. A software modernization system analyzes software applications to generate various types of modernization report information, where the report information can include identifications of various types of design and cloud anti-patterns, proposed decompositions of monolithic applications into subunits, refactoring cost information, recommended modernization tools and migration paths, among other such information. A software modernization system further includes a refactoring engine that can automatically refactor source code based on such application analysis information, e.g., to automatically address identified anti-patterns, restructure code for decomposition, etc. A refactoring engine performs refactoring actions based on refactoring templates, machine learning (ML) refactoring models, or other input.

18 Claims, 10 Drawing Sheets

(56) References Cited

U.S. PATENT DOCUMENTS

| | | | |
|---|---|---|---|
| 2011/0219361 A1* | 9/2011 | Dolby | 717/136 |
| 2016/0062753 A1 | 3/2016 | Champagne | |
| 2016/0299831 A1* | 10/2016 | Cimadamore | G06F 8/75 |
| 2017/0052831 A1* | 2/2017 | Wu | G06F 11/3476 |
| 2017/0212829 A1* | 7/2017 | Bales | G06F 11/3604 |
| 2019/0171438 A1* | 6/2019 | Franchitti | G06F 16/903 |
| 2021/0049090 A1* | 2/2021 | Mola | G06F 11/3664 |
| 2021/0149648 A1* | 5/2021 | Velammal | G06N 20/00 |
| 2021/0182055 A1 | 6/2021 | Gross et al. | |
| 2021/0182703 A1* | 6/2021 | Velammal | G06N 5/046 |
| 2021/0232473 A1 | 7/2021 | Laskawiec | |
| 2021/0271802 A1* | 9/2021 | Kramer | G06N 3/08 |
| 2022/0253323 A1* | 8/2022 | Makhija | G06F 9/454 |

OTHER PUBLICATIONS

Ioannidis et al., "PanRep: Universal node embeddings for heterogeneous graphs", arXiv:2007.10445, Jul. 2020, 20 pages.

Borovits et al., "DeepIaC: Deep Learning-Based Linguistic Anti-pattern Detection in IaC", MaLTeSQuE '20, Nov. 13, 2020, 7 pages.

Kumar et al., "An Empirical Analysis on Web Service Anti-Pattern Detection using a Machine Learning Framework", 2018 42nd IEEE International Conference on Computer Software & Applications, 2018, 10 pages.

Kurbatova et al., "Recommendation of Move Method Refactoring Using Path-Based Representation of Code", 2020 IEEE/ACM 42nd International Conference on Software Engineering Workshops (ICSEW '20), May 23-29, 2020, 8 pages.

Liu et al., "Deep Learning Based Feature Envy Detection", ASE '18, Sep. 3-7, 2018, 12 pages.

Liu etal., "Deep Learning Based Code Smell Detection", IEEE Transactions on Software Engineering, vol. 47, No. 9, Sep. 2021, 27 pages.

Non-Final Office Action, U.S. Appl. No. 17/118,375, dated Dec. 21, 2021, 19 pages.

Notice of Allowance, U.S. Appl. No. 17/118,375, dated Jun. 29, 2022, 12 pages.

Notice of Allowance, U.S. Appl. No. 17/118,375, dated Oct. 13, 2022, 9 pages.

* cited by examiner

AUTOMATIC SOURCE CODE REFACTORING TO MITIGATE ANTI-PATTERNS

BACKGROUND

Software modernization techniques are widely used by business organizations and other entities desiring to improve their information technology (IT) environments in response to changing software application use cases, resource demands, and user access patterns. For example, while many legacy applications were designed for older operating environments with lesser resources and expectations, modern applications now often need the ability to scale quickly to potentially millions of users, have global availability, manage very large amounts of data, and respond to requests in milliseconds. The various processes for upgrading, converting, and rewriting such applications to enable improved performance is referred to generally as "software modernization." Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various embodiments in accordance with the present disclosure will be described with reference to the drawings, in which.

DETAILED DESCRIPTION

Figure 1:
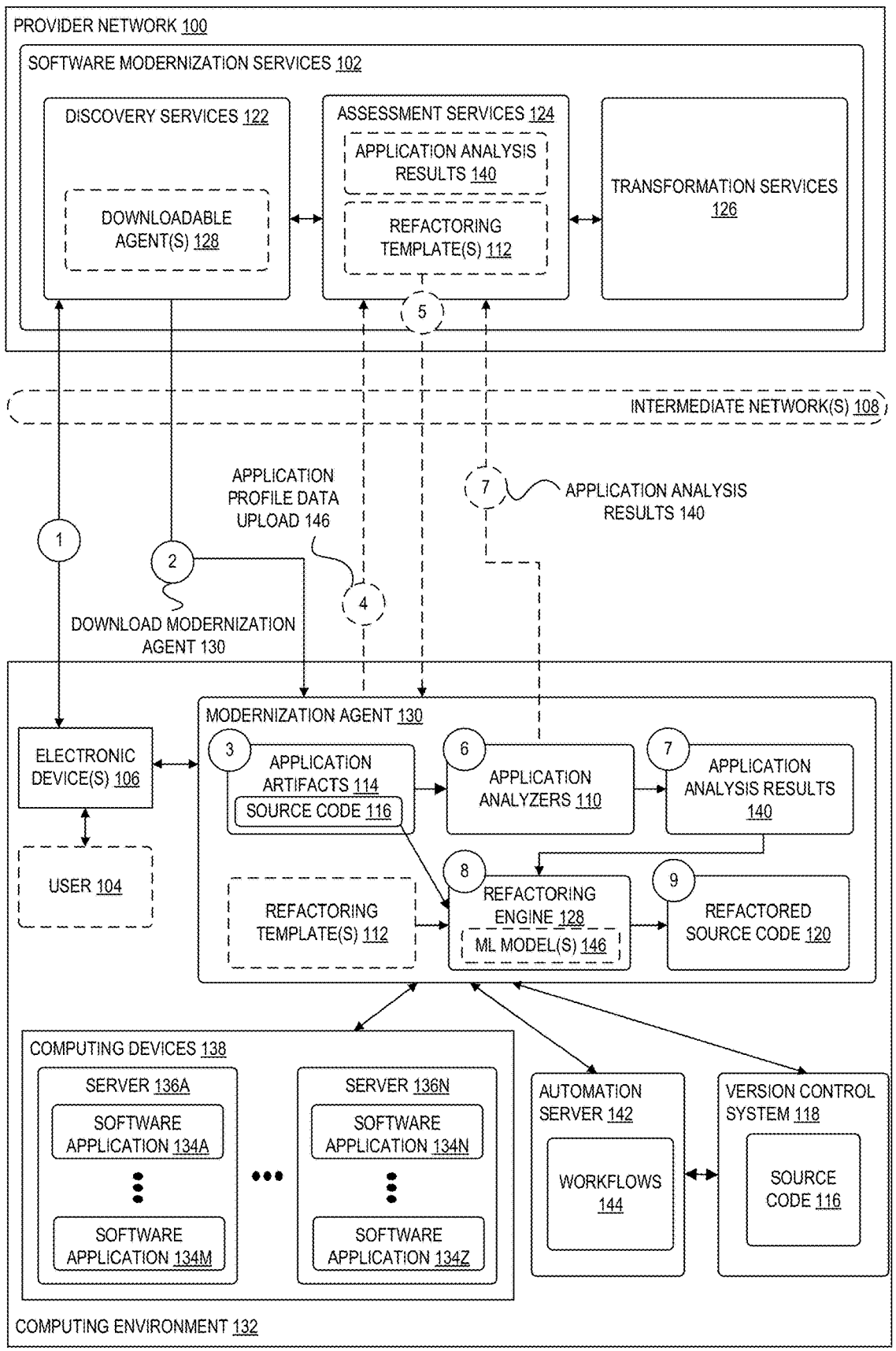
FIG. 1 is a diagram illustrating an environment for enabling the automatic refactoring of software application source code to mitigate anti-patterns and other software modernization-related issues according to some embodiments.

The present disclosure relates to methods, apparatus, systems, and non-transitory computer-readable storage media for enabling the automatic refactoring of software application source code to mitigate anti-patterns and other software modernization-related issues identified by a software modernization system. As described herein, a software modernization system analyzes software applications to generate various types of modernization report information including, for example, identifications of various types of design and cloud anti-patterns, proposed decompositions of monolithic applications into independently deployable sub-units, refactoring cost information, recommended modernization tools and migration paths, and the like. According to embodiments, a software modernization system further includes a refactoring engine that can automatically refactor source code based on such modernization report information, for example, to modify source code to address identified anti-patterns, to restructure code for decomposition purposes, and so forth. In some embodiments, a refactoring engine performs refactoring actions based on refactoring templates, augmented programming language files, machine learning (ML) refactoring models, or other input. A refactoring template, for example, includes a set of refactoring rules, where each refactoring rules identifies a component of a software application's source code (e.g., a package, a file, a class, a method, etc.) and an action for modifying the component or, another component related to the identified component, to address an associated anti-pattern or other issue. Among other benefits, the automatic refactoring of software applications to mitigate anti-patterns and other modernization-related issues helps to increase the performance, scalability, and security of software applications.

Software modernization broadly refers to converting, rewriting, or porting legacy software applications or systems to more modern computer programming languages, software libraries, protocols, hardware platforms, application architectures, cloud-based services, and the like. Users, business organizations, and other entities may often desire to modernize their software applications and systems to improve operational performance and increase application availability, to reduce exposure to vulnerabilities (e.g., software crashes, security vulnerabilities, etc.), to migrate applications from non-cloud environments to infrastructure provided by a cloud services provider (e.g., to leverage a cloud service's provider reliable infrastructure, increased performance benefits, etc.), and to enable more efficient ongoing development of the applications, among other possible reasons.

One aspect of many software modernization processes involves the identification of so-called "anti-patterns" associated with a software application. An anti-pattern generally represents any undesirable characteristic of a software application for which a known, better software development pattern exists. While a software application containing one or more anti-patterns may generally operate as its developers intend in most environments, the presence of such anti-patterns may cause the application to be ineffective or otherwise experience issues in other execution environments (e.g., in virtualized computing environments, cloud-based environments, etc.), when attempting to scale the application, or under unexpected input conditions. Thus, it is typically desirable to refactor software applications having identified anti-patterns to replace the anti-patterns with more resilient implementation patterns and better software design practices. Once a software modernization system identifies one or more anti-patterns associated with a software application, it may generate a modernization report or other output that provides information identifying the anti-patterns, an expected cost to correct the identified anti-patterns (e.g., in terms of excepted developer hours to refactor the software), among other information. Existing software modernization systems however then typically require human software developers to manually refactor software applications to address any identified anti-patterns, where such refactoring processes are often time-consuming, challenging to implement, and error prone.

These challenges, among others, are addressed by the software modernization system described herein, which includes an automated refactoring engine that is capable of automatically refactoring application source code to mitigate identified anti-patterns and other software modernization-related issues. According to embodiments described herein, the refactoring engine uses modernization service or user-provided refactoring templates, augmented programming logic, ML-based refactoring models, or other input to automatically refactor source code to address anti-patterns and other issues with minimal effort from software developers or other users. Among other benefits, the efficient refactoring of software applications undergoing modernization processes described herein enables the efficient creation of more resilient software applications, migration of software applications to cloud-based environments, and use of computing resources supporting execution of such applications.

FIG. 1 is a diagram illustrating an environment for enabling the automatic refactoring of software application source code to mitigate anti-patterns and other software modernization-related issues according to some embodiments. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 (e.g., including user 104) may utilize one or more user accounts that are associated with a customer account, though these terms may be used somewhat interchangeably depending upon the context of use. Users may interact with a provider network 100 across one or more intermediate networks 108 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network 100 typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network 100 via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network 100 may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In some embodiments, a provider network 100 includes a hardware virtualization service. The hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs) and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some embodiments, a provider network 100 includes a container service. A container service can be a container orchestration and management service (referred to in various implementations as a container service, cloud container service, container engine, or container cloud service) that allows users of the cloud provider network to instantiate and manage containers. In some embodiments the container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some embodiments, software modernization services 102 include discovery services 122, assessment services 124, and transformation services 126, where these services are collectively aimed at helping users to discover and use recommended transformation and migration paths for their software applications. The discovery services 122, for example, include various services, applications, software agents, and other tools (e.g., including downloadable modernization agents 130) used to identify software applications in users' computing environments, to collect profile information for identified software applications, and to perform other analysis and modernization processes. The assessment services 124 enable users and applications to obtain various types of software modernization assessments and recommendations based on obtained application artifacts (e.g., source code, bytecode, intermediate language files, etc.) collected for users' applications identified by the discovery services 122 and associated tools. For example, the recommendations generated by an assessment service 124 can include recommended modernization strategies, recommended modernization tools, estimated modernization costs, etc. In some embodiments, the transformation services 126 generally include services and applications that can be used to implement modernization recommendations and migration paths, e.g., based on the performed analyses and recommendations.

According to embodiments described herein, the software modernization services 102 further enable the automatic refactoring of source code and other components of a software application's implementation (e.g., configuration files, frameworks, annotations, etc.) to address various types of anti-patterns and other issues identified by the software modernization services 102 (e.g., design and cloud anti-patterns, monolithic application decomposition recommendations, etc.). For example, in some embodiments, a modernization agent 130 includes one or more application analyzers 110 configured to statically and dynamically analyze application artifacts (e.g., application artifacts 114 including source code 116, bytecode, intermediate code files, or combinations thereof) obtained for software applications undergoing analysis (e.g., any of software applications 134A-134Z running on servers 136A-136N or computing devices 138). In some embodiments, based on the performed application analyses, an application analyzer 110 generates application analysis results 140 including, e.g., graph-based models of dependency relationships among application components, information identifying detected anti-patterns, estimated refactoring costs, modernization tool recommendations, and the like. According to embodiments described here, a modernization system further includes a refactoring engine 128 that can be used to automatically refactor source code 116 based on identified anti-patterns and other analysis results, as indicated above. As described in more detail herein, in some embodiments, a refactoring engine 128 can refactor code based on refactoring template(s) 112 defining refactoring rules for particular types of identified source code components, augmented programming logic defining refactoring logic in a declarative language, machine learning (ML) models 146 used to recommend refactoring actions based on source code analyses, or other automated refactoring input and processes.

In FIG. 1, the circles labeled "1"-"9" illustrate an example process in which a user obtains a modernization agent 130 used to inventory and analyze software applications in the user's computing environment and to refactor application source code 116 using a refactoring engine 128 to mitigate anti-patterns and other software modernization-related issues. In some embodiments, at circle "1" in FIG. 1, a user accesses the software modernization services 102 (for example, via various interfaces provided by discovery services 122) to obtain information about available modernization services and tools including downloadable agent(s) 130. In some embodiments, at circle "2," a modernization agent 130 is downloaded and installed on servers within a user's on-premises computing environment 132 (e.g., on a physical server or VM). Users (e.g., a user 104) can use a computing device 106 to interact with the modernization agent 130 via a command line interface (CLI), graphical user interface (GUI), or any other type of interface provided by the modernization agent 130.

In some embodiments, the modernization agent 130 includes one or more application analyzer(s) 110 used to analyze one or more software applications 134A-134Z running in the user's computing environment 132. The software applications 134A-134Z, for example, may include applications deployed on Linux®-based or Windows®-based hosts and generally represent any type of software that may be executing in a computing environment (e.g., software implementing a web application or service, business application software, etc.). Each of the software applications can be a single process or a group of interoperating processes and may execute within a virtualized or non-virtualized execution environment (e.g., the Java® virtual machine (JVM) in the case of a Java application, or any other execution environment for other types of applications).

As part of a modernization assessment process, in some embodiments, a user invokes an inventory command provided by an modernization agent 130 and used to identify applications within the user's computing environment 132 that can be assessed (e.g., including some or all of software applications 134A-134Z in the example of FIG. 1), to collect application artifacts 114 related to the identified applications, and to optionally perform various preliminary analyses of the identified applications. In some embodiments, instead of interacting directly with the modernization agent 130, the user 104 may instead interact with a web-based console or other interface provided by the software modernization service 102. The software modernization service 102 may then in turn instruct an modernization agent 130 or other application running in the user computing environment 132 to perform some or all of the inventory operations described in reference to FIG. 1 such as, for example, identifying an inventory of applications, obtaining application artifacts 114 for the applications (e.g., including source code 116, binary executable file information identifying JAR files, DLL files, process identifiers, intermediate language files, etc.), among other possible application profile information.

In some embodiments, at circle "3," a user 104 configures the modernization agent 130 or modernization service 102 with the ability to access an automation server 142 in the user's computing environment, the provider network 100, or elsewhere, e.g., to collect bytecode files or other types of application artifacts. In some embodiments, the automation server 142 broadly represents any type of server, service, application, or other tool that helps automate various software development processes such as, for example, building, testing, and deploying software applications. An automation server 142, for example, may automate such processes in an effort to facilitate a continuous integration and continuous delivery approach to software development and deployment. In some embodiments, the automation server 142 is a server-based system that interfaces with version control tools (e.g., a version control system 118) to identify changes to a repository (e.g., code commits) or other events and may further include configurations used to automate one or more actions responsive to the detection of such events. In some embodiments, users can use an automation server 142 to configure any number of workflows 144 (sometimes also referred to as "jobs," "pipelines," or "projects"), each representing a defined configuration of automated processes for building, testing, and/or deploying software applications. In this example, each workflow may be associated with a configuration file or other data that defines various actions, parameters (e.g., locations of source repositories, names of binary executable files to be generated, locations at which to store binary executable files, etc.). In some embodiments, an automation server 142 provides an interface (e.g., a network-accessible API) via which users and applications can request server-related information and perform various actions including, e.g., obtaining a list of configured workflows, obtaining configuration information associated with configured workflows, creating new workflows, etc.

In some embodiments, at circle "4," the modernization agent 130 optionally uploads some or all of the obtained application profile data and artifacts 114. An assessment service 124 may use the uploaded application profile data, for example, to create a software application list that associates the identified software applications with a user account used by the user 104 to interact with the cloud provider network 100. The software application list, for example, may be displayed to a user in a GUI or other interface to provide a user with information about the discovered set of applications in the user's computing environment 132. In other embodiments, the application profile data is stored only locally by the modernization agent 130.

In some embodiments, at circle "5," either an assessment service 124 or modernization agent 130 initiates processes, at circle "6," to statically or dynamically analyze a software application identified by the modernization agent 130. For example, based on the identified set of software applications in the user's computing environment 138, a user can request one or more types of analyses such as dependency analyses, monolithic application decomposition recommendations, detection of design and cloud anti-patterns, and the like. For example, an application analyzer 110 may identify, based on anti-pattern definitions, anti-pattern ML models, or other data, various different types of anti-patterns (e.g., the use of fixed IP addresses, local file system access, etc.). In some embodiments, a modernization agent 130 further obtains, from the assessment services 124 one or more refactoring template(s) 112 or other data used to automatically refactor the analyzed source code 116, as described in more detail herein. In other embodiments, the refactoring template(s) 112 are included with the modernization agent or provided by a user of the modernization agent 130.

In some embodiments, at circle "7," the software modernization services 102 generate, based on the output of one or more application analyzers 110, application analysis results 140. In some embodiments, the application analysis results 140 include various modernization recommendations and other information obtained about one or more of the software applications analyzed by the agent 130. For example, the application modernization assessment report may include information from the obtained application artifacts 114 and other profile data, information about identified anti-patterns or other modernization-related issues, information about recommendation modernization strategies and modernization tools that can be used, and the like.

In some embodiments, one or more of the identified anti-patterns may be associated with a severity level identified in the application analysis results 140, where a severity level may indicate that the anti-pattern is of low severity and the application can be migrated to a cloud services provider with minimal effects, of medium severity and certain aspects of the application may not operate as intended in a cloud-based environment, or of high severity and will prevent the implementation of the application in a cloud-based environment, etc. In some embodiments, one or more of the identified anti-patterns are associated with an anti-pattern category defined by the software modernization services 102. An anti-pattern category may be used to group a collection of similar anti-patterns, where the category may be further associated with a collection of modernization tools and recommendations that may be used to address some or all of the anti-patterns in the same category. In some embodiments, the information associating anti-patterns to anti-pattern categories, and anti-pattern categories to modernization tools and recommendations, is stored in a knowledge base managed by the assessment services 124.

Figure 2:
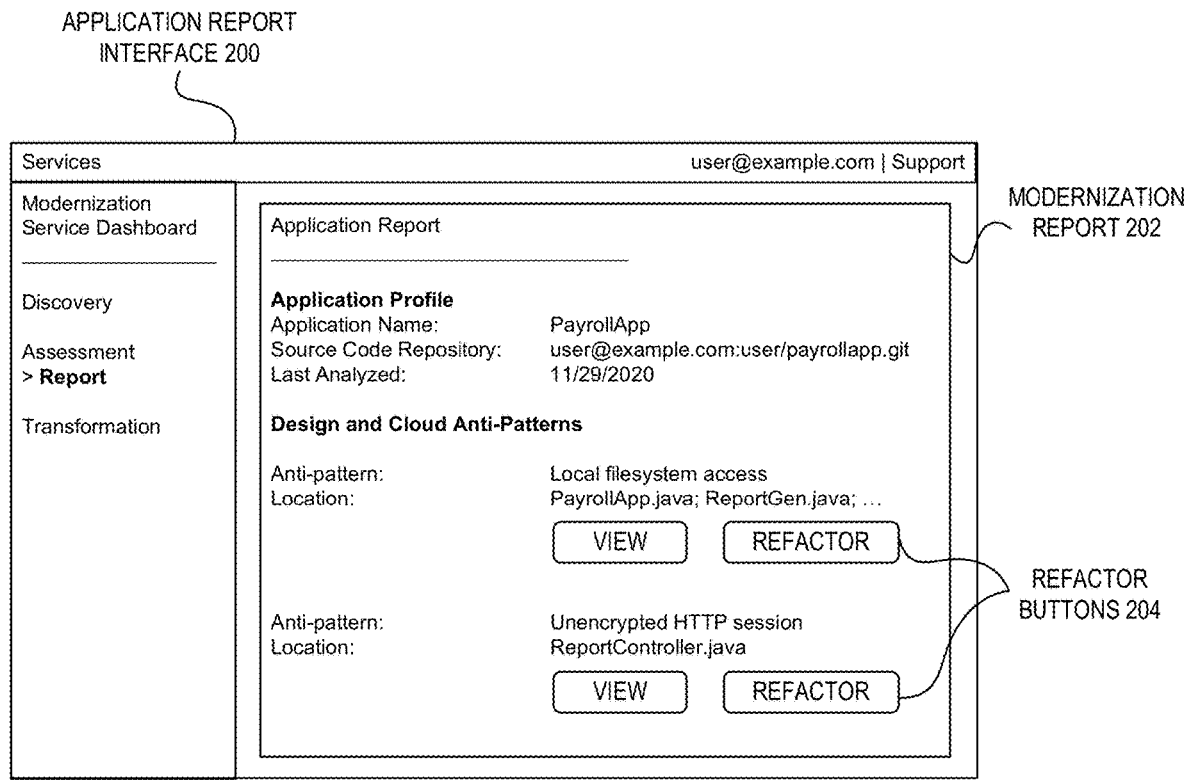
FIG. 2 illustrates an example graphical interface displaying an assessment report including interface elements that can be selected to initiate automated refactoring processes to mitigate identified anti-patterns and other software modernization-related issues according to some embodiments.

FIG. 2 illustrates an example graphical interface displaying an assessment report including interface elements that can be selected to initiate automated refactoring processes to mitigate identified anti-patterns and other software modernization-related issues according to some embodiments. As shown, the application report interface 200 includes a modernization report 202 displaying information about an analyzed application, e.g., by one or more application analyzers 110 of a modernization agent 130. In the example FIG. 2, the modernization report 202 includes application profile information (e.g., an application name, a location of source code associated with the application, an indication of when the application was last analyzed, etc.). The example modernization report 202 further includes a list of identified design and cloud anti-patterns, where each item indicates a type of anti-pattern and a location in the source code where the anti-pattern was identified. In some embodiments, an application report interface 200 includes refactor buttons 204 that can be selected by a user to initiate the automatic refactoring of the associated anti-patterns. For example, selection of the refactor button 204 associated with the "local filesystem access" may invoke a refactoring engine 128 to perform refactoring actions based on information contained in a refactoring template or in other input. In other embodiments, users can initiate the automatic refactoring of source code to address identified anti-patterns using other interfaces such as a CLI, API, an integrated development environment (IDE) interface, etc. In yet other embodiments, users can elect to manually modify source code to address one or more identified anti-patterns, where a modernization plug-in or other tool can be used to provide refactoring recommendations based on ML refactoring models, as described in more detail hereinafter.

Returning to FIG. 1, in some embodiments, at circle "8," a refactoring engine 128 is invoked to refactor source code associated with the software application undergoing the modernization analyses. As indicated above, the refactoring of a software application to address one or more identified anti-patterns or other modernization-related issues may be initiated by a user responsive to viewing application analysis results 140 or other information or, in some embodiments, automatically based on identified anti-patterns or other modernization-related issues. In some embodiments, the refactoring engine 128 performs the refactoring based at least in part on one or more refactoring template(s) 112 (e.g., including a structured or semi-structured data representation of refactoring rules, logic expressed in an augmented programming language or standard programming language, etc.), ML model(s) 146, or other input data.

Figure 3:
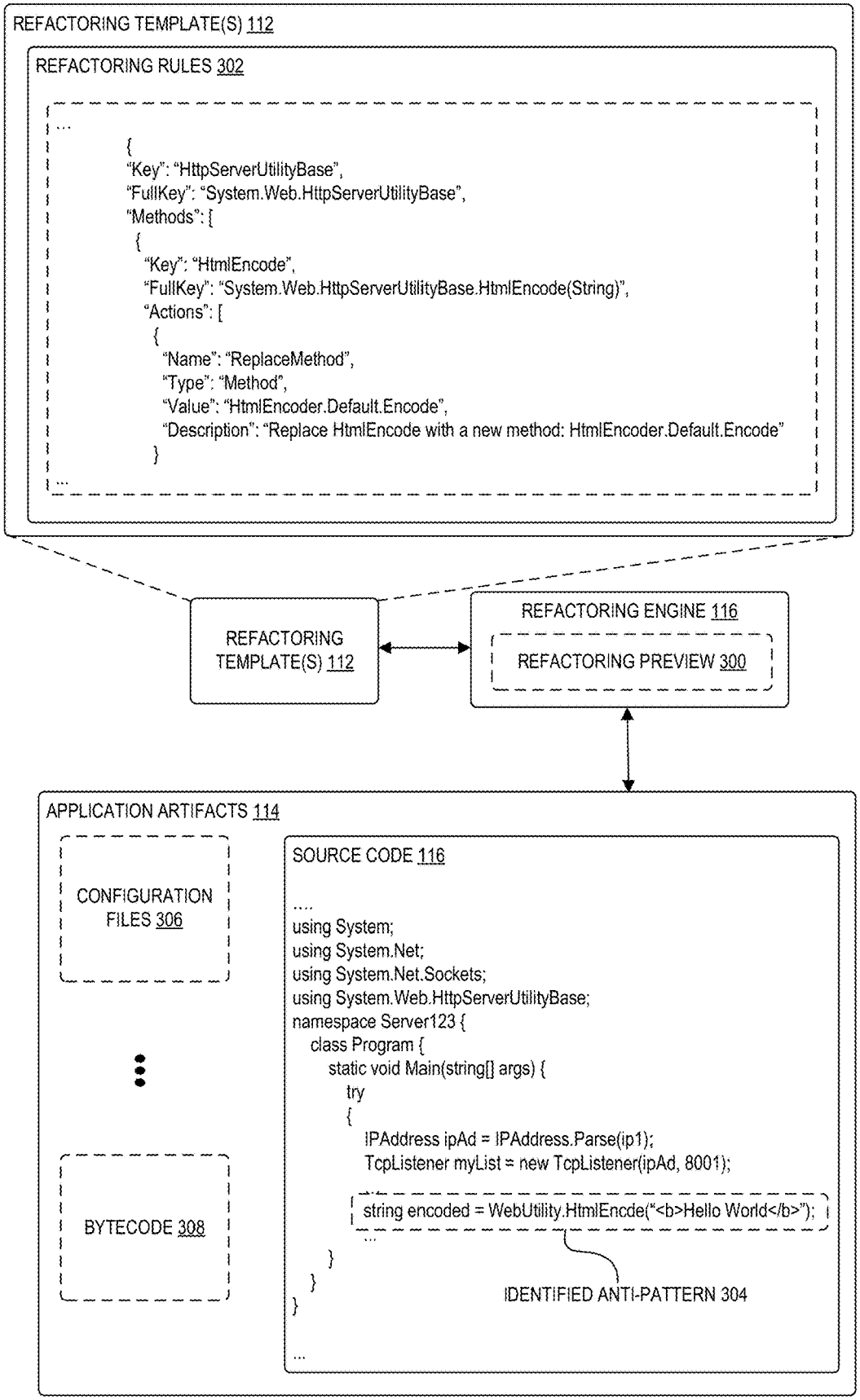
FIG. 3 is a diagram illustrating a refactoring engine using refactoring templates to refactor components of source code associated with a software application according to some embodiments.

FIG. 3 is a diagram illustrating a refactoring engine using refactoring templates to refactor components of source code associated with a software application according to some embodiments. In some embodiments, a refactoring template 112 includes refactoring rules 302, where each refactoring rule may be associated with one or more known types of anti-patterns. For example, one refactoring rule may be defined for an anti-pattern associated with local filesystem access, a second refactoring rule may be defined for an anti-pattern associated with the use of fixed IP addresses, and the like. In some embodiments, a refactoring rule is associated with a key or identifier that is used to map the refactoring rule defined in a refactoring template 112 to the anti-patterns identified as part of application analysis results 140. For example, a request to invoke an automated refactoring of source code based on a particular identified anti-pattern may cause the refactoring engine 128 to identify one or more corresponding refactoring rules 302 associated with a key or identifier of the particular anti-pattern.

As shown in FIG. 3, one or more refactoring template(s) 112 are provided as input to a refactoring engine 128, where the refactoring template(s) 112 include any number of refactoring rules 302. A snippet of a refactoring rule 302 is shown, where the refactoring rule is associated with an anti-pattern (e.g., identified by a key specified as part of the rule), an identifier of one or more source code components (e.g., packages, files, classes, methods, or data objects), and one or more refactoring actions to be applied to source code component. For example, the identified source code components may be portions of the source code known to contribute to an identified anti-pattern (e.g., deprecated packages, methods, etc.) and the actions may specify mechanisms for correcting the associated anti-pattern (e.g., by modifying text associated with the source code component, deleting the source code component, creating a new source code component, or replacing the source code component with a different source code component). The source code component to which a refactoring action is to be applied can be the same source code component identified as part of the rule (e.g., a refactoring rule might identify a particular method and a refactoring action specified as part of the rule modifies the particular method), or another source code component related to the identified source code component (e.g., a refactoring rule might identify a particular class and a refactoring action specified as part of the rule modifies a method included in the class, etc.).

Figure 4:
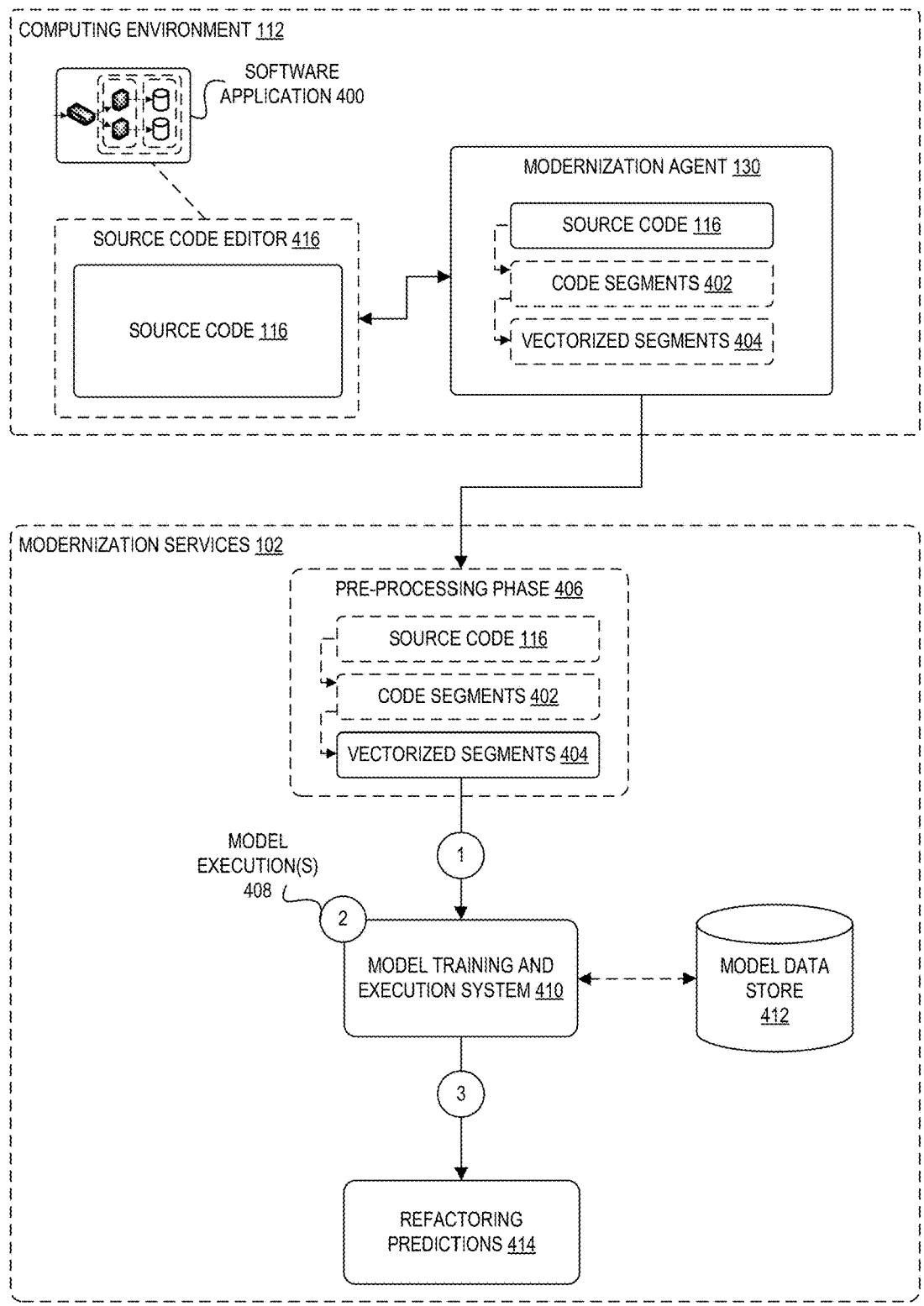
FIG. 4 is a diagram illustrating the use of an anti-pattern refactoring machine learning (ML) model to assist with refactoring software application source code according to some embodiments.

In the example of FIG. 4, the identified anti-pattern 304 corresponds to a component of the source code 116 (e.g., a method known to contribute to a particular type of anti-pattern), where the portion of the source code corresponding to the identified anti-pattern 304 (or a portion of source code related to the identified source code portion) may be modified according to one or more refactoring actions (e.g., to replace a package with another package, or to add a new method to an identified class, etc.). In some embodiments, the refactoring actions can also include modifying configuration files 306 associated with a software application, bytecode 308, or any other artifacts associated with the application's implementation.

In some embodiments, a refactoring engine 128 provides a refactoring preview 300 of changes to be applied to source code (e.g., source code 116). For example, before applying any changes to the source code based on applicable refactoring rules, a refactoring engine 128 may first identify locations in the source code associated with one or more refactoring rules and cause display of information (e.g., in a web-based interface, application interface, CLI interface, etc.) describing one or more modifications to be made to the identified source code (e.g., where a description of the changes to be made may be included as part of the associated refactoring rules). In some embodiments, responsive to receiving input approving the proposed modifications described in a refactoring preview 300, the refactoring engine 128 may carry out the modifications, where such approval may be received for each individual modification or the modifications collectively. In some embodiments, to carry out the approved actions, the refactoring engine 128 performs various operations to the actual source code 116 (or a copy of the source code 116) such as, for example, modifying the source code text, adding or deleting source code, creating new source code or application artifacts, etc. In some embodiments, once the operations are complete, the refactoring engine 128 may generate output indicating whether some or all of the operations were successful and a report of the changes made for user review.

As indicated above, in some embodiments, a refactoring rule may be associated with only a single refactoring action or with a plurality of refactoring actions. As an example, one refactoring rule may be associated with a first action that replaces a package used by the application with a different package and a second action that replaces a method to a different method associated with the newly updated package. In general, each refactoring rule can be associated with any combination of actions involving the modification or addition to the source code associated with the software application undergoing the modernization processes. Furthermore, each refactoring template can include refactoring rules associated with any number of distinct anti-patterns or other issues, and the refactoring engine 128 can take as input any number of separate refactoring templates.

In some embodiments, a refactoring template 112 is provided by the modernization services 102 or by a user of the modernization agent 130. For example, the modernization services 102 may provide a collection of refactoring templates 112 that are designed to help users refactor particular types of software applications, applications written in particular types of programming languages or frameworks, or based on any other similarities. In some embodiments, users can also modify existing refactoring templates 112 or create new templates for particular use cases. The refactoring templates 112, for example, may be expressed using a particular format (e.g., a JSON-based format) where users can create their own refactoring rules by specifying source code components (e.g., based on text tokens identifying the components) to identify and refactoring actions to be performed if the refactoring engine 128 identifies the components in the source code.

In some embodiments, the refactoring templates 112 can include augmented programming logic expressed in an augmented programming language. Augmented programming is an approach that allows software developers to write declarative business logic that can be translated by a tool (e.g., a refactoring engine 128) into programming code. The declarative abstracted logic is typically written in a domain specific language. The abstracted logic layer increasingly incorporates machine learning (ML) to drive algorithmic source code generation. In some embodiments, the refactoring templates 112 can include logic expressed in a declarative domain specific language to describe actions to be performed for each design or cloud anti-patterns. For example, users may also be able to specify custom refactoring actions, e.g., defined using custom source code, augmented programming language code, or the like.

In some embodiments, ML-based refactoring techniques can be used instead of or in addition to the use of refactoring templates as described above. For example, graph neural networks (GNNs) are neural networks that can be applied to graph-based analyses of software applications' source code. In some embodiments, such models can be used for graph level, node level, and edge level prediction of refactoring changes to address various types of anti-patterns or other modernization issues. A snippet of source code identified as being associated with an anti-pattern, for example, can be translated into an abstract syntax tree (AST) or graph model representation, the AST or graph model can be used to obtain a set of syntactic vectors with attention weights, and a single vector can be derived from the syntactic vectors for deep learning training. A model trained based on source code snippets associated with known anti-patterns can be used to identify anti-patterns in other source code.

In some embodiments, historical anti-pattern refactoring information similarly can be used to obtain a code snippet associated with an anti-pattern, translate the code snippet into an AST or graph model representation, obtain a set of syntactic vectors based on the AST or graph model with attention weights, and finally obtain a single vector or embedding representing the anti-pattern code snippet. This vector representation of the code snippet can be used as an anti-pattern embedding for training a deep learning model to recognize anti-patterns or refactoring recommendations when provided with embeddings new code snippets. The trained model can then be used for automatically identifying anti-pattern refactoring methods, where the model can recommend operations to mitigate particular types of identified anti-patterns.

FIG. 4 is a diagram illustrating the use of an anti-pattern refactoring machine learning (ML) model to refactor software application source code according to some embodiments. In some embodiments, the training and execution of the ML refactoring model(s) 146 is performed by a model training and execution system 410, which may be part of the application modernization services 102, implemented by another service of the cloud provider network 100, or implemented by any other computing resources accessible to the application modernization services 102. In some embodiments, a ML refactoring model 146 is trained based on refactoring training data obtained from various sources, as described in more detail herein.

The ML models 146 generally can be any suitable model for predicting refactoring actions to be applied to detected anti-patterns in source code or other application artifacts, including a neural model, support vector machines, linear or logistic regression, random forests, decision trees, or other suitable models. The ML models 146 can include individual models or ensembles of models. Such models include parameters (e.g., for a neural network, weights of connections between nodes in different layers) that are learned from data during the training process in which the parameters are tuned to produce expected outputs given corresponding inputs in training data. Thus, a ML model is an adaptive system that is configured to change its structure (e.g., connection configuration and/or weights) based on information that flows through the model during training, and the learned parameters of the hidden layers can be considered as an encoding of meaningful patterns in the data. It will be appreciated that during inference (the phase of machine learning in which a trained model is used to make recommendations or predictions based on new input data), these learned parameters and the structure (e.g., flow of information, computations) of the model are stored in computer hardware (e.g. disk or memory) and then executed by one or more processors.

In some embodiments, the application modernization services 102 uses refactoring training data (e.g., including obtaining a refactored version of source code including one or more anti-patterns, and generating the refactoring training data to include the original source code and labels corresponding to one or more actions used to modify the source code to address the anti-patterns) to train one or more ML models 146. In some embodiments, the refactoring training data is used as input to a model training and execution system 410 to train one or more ML refactoring model(s) 146. For example, a ML refactoring model is trained to automatically identify refactoring suggestions based on a semantic understanding of various source code snippets' semantic purpose. In some embodiments, the correspondence between source code snippets and refactoring suggestions is learned using a neural network, or other type of machine learning model, where the model learns source code snippet embeddings and attention weights collectively used to represent the snippets as vectors that can be compared to one another (e.g., to determine the probability that a given source code snippet is associated with one or more known refactoring suggestion labels).

In some embodiments, the model training and execution system 410 obtains refactoring training data, including a source code snippet or other application artifact segment (of any number of possible application artifact segments included in the training data), from a data store or other data source. In some embodiments, the training process includes a pre-processing phase that involves converting the source code snippets from the training data into vectorized segments (also referred to as "embeddings"). As indicated herein, some or all of the pre-processing phase 322 operations may be performed by an agent 130 running in a computing environment, by components of the application modernization services 102, or any combination thereof.

A ML model, generally, may be thought of as one or more equations that are "trained" using a set of training data. Machine learning refers to a discipline by which computer systems can be trained to recognize patterns or features through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating performance of the trained model. The learned parameters of the model can be considered as an encoding of meaningful patterns in the training data, such that the trained model can then recognize these same patterns in new data. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time.

A ML model as described herein can be trained to recognize anti-patterns or refactoring recommendations using input code snippets, or by using embeddings of code snippets such as anti-pattern embeddings provided by a separate ML model. In some embodiments, the example training process includes a decomposition phase, an aggregation phase, and a prediction phase, where application artifact segments (e.g., code snippets) and associated refactoring suggestion labels are used to iteratively train the model. The ML model in some embodiments may be trained to recognize (as labels) specific anti-patterns classes in a predefined set which are in turn mapped to the refactoring recommendations. In other embodiments, the ML model may be trained to generate a similarity measure between a new input code snippet embedding and the anti-pattern embeddings it saw during training, and the similar antipatterns may be used as a basis for providing refactoring recommendations that are suitable for such antipatterns. In some embodiments, the application artifact segments are obtained by parsing the source code of the anti-pattern training data to segment the source code into individual functions, classes, or other logical divisions of the code. As indicated above, the parsing and segmentation of the source code can be performed by an agent 130, the model training and execution system 410, or any other component. In some embodiments, the model architecture and training process is based in part on the code2vec neural model (e.g., as described by Uri Alon, Meital Zilberstein, Omer Levy, and Eran Yahay. 2019. code2vec: Learning Distributed Representations of Code. *Proc. ACM Program. Lang.* 3, POPL, Article 40 (January 2019)), although other types of models can be used. In some embodiments, the training of a model 146 can utilize transfer learning techniques to apply aspects of the code2vec model or other models to a model for detecting anti-patterns. In other embodiments, the model architecture or training process is based on other architectures or training process such as, e.g., the PanRep framework described by Vassilis N. Ioannidis, Da Zheng, and George Karypis. 2020. *PanRep: Universal node embeddings for heterogeneous graphs*, arXiv:2007.10445 (July 2020). For example, in some embodiments, a graph neural network (GNN) model is used, where a GNN learns embeddings from source code, and these embeddings may be employed as features by other models (e.g., a support vector machine (SVM) or DistMult model) to be trained for downstream tasks (e.g., identifying recommended refactoring actions). In general, the ML-based techniques described herein can include the use of several models in a processing chain to derive refactoring recommendations from input source code.

In some embodiments, the input to the model is an application artifact segment, as described above, and one or more corresponding labels corresponding to refactoring suggestions known to have been used to address anti-patterns found in the segments. In some embodiments, a graph-based representation of the segment (e.g., an abstract syntax tree) is generated, where the graph-based representation represents the abstract syntactic structure of the segment. In some embodiments, in a decomposition phase, based on the graph-based representation the application artifact, the segment is then represented as a collection of its "syntactic paths," e.g., where each syntactic path corresponds to a path between terminal nodes in the AST or other graph-based representation of the segment. For example, the model training and execution system 410 may traverse the graph-based representation of the segment to extract the syntactic paths between graph leaves and to generate syntactic path vectors. In some embodiments, each syntactic path vector represents a corresponding syntactic path of the graph-based representation of the segment, with values representing the terminal nodes of the path along with information about linkages between the nodes.

In an aggregation phase, the model training and execution system 410 further generates an embedding for each of the syntactic path vectors using one or more fully connected layers. In some embodiments, a neural attention network architecture, including learned attention weights, is further used to aggregate the embeddings into a single aggregated snippet vector. For example, the attention weights are trained to apply a particular amount of "attention" to each embedding to arrive at the aggregated snippet vector. This enables an aggregation of the information captured in the syntactic path vectors into a single vector that captures information about the entire application artifact received as input. In some embodiments, the attention weights are learned simultaneously with the embeddings.

In some embodiments, at the prediction phase, the model training and execution system 410 then predicts the probability for each labeled refactoring suggestion given the aggregated snippet vector. In some embodiments, the model is trained using a gradient descent-based algorithm, (e.g., such as the AdaGrad algorithm) and back-propagation techniques through each of the learned parameters, where the model may be trained over time as additional refactoring training data becomes available, as described above.

In some embodiments, users can interact with the model training and execution system 410 via a frontend of the model training and execution system 410. For example, a user device can provide a training request that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, a container image can include one or more layers, where each layer represents an executable instruction. Some or all of the executable instructions together represent an algorithm that defines a ML model. The executable instructions (for example, the algorithm) can be written in any programming language (for example, Python, Ruby, C++, Java, etc.). In some embodiments, the algorithm is pre-generated and obtained by a user, via the user device, from an algorithm repository. In some embodiments, the algorithm is completely user-generated or partially user-generated (for example, user-provided code modifies or configures existing algorithmic code).

In some embodiments, instead of providing a container image (or identifier thereof), the user device may provide an algorithm written in any programming language. The model training and execution system 410 may then package the algorithm into a container (optionally with other code, such as a "base" ML algorithm supplemented with user-provided code) that is eventually loaded into a virtual machine instance for training a machine learning model. In some embodiments, the model training and execution system 410 can handle the acquisition and configuration of compute capacity (for example, containers, instances, etc., which are described in greater detail below) based on the information describing the computing machine on which to train a ML model provided by the user device. The model training and execution system 410 can then train ML models using the compute capacity.

To perform the ML model training, in some embodiments, computing resources execute instructions according to hyperparameter values included in the training request. As an illustrative example, a model training and execution system 410 trains a ML model by identifying values for certain parameters (for example, coefficients, weights, centroids, etc.). The identified values depend on hyperparameters that define how the training is performed. Thus, the computing resources can execute the executable instructions to initiate a ML model training process, where the training process is run using the hyperparameter values included in the training request. Execution can include applying the obtained training data as input parameters to some or all of the instructions being executed.

In some embodiments, the model training processes generate model data. The model data may be stored, for example, in one or more data files in a model data store and can include characteristics of the ML model being trained, such as a number of layers in the machine learning model, hyperparameters of the machine learning model, coefficients of the machine learning model, weights of the machine learning model, and/or the like. In particular, the generated model data includes values for the characteristics that define the ML model being trained.

In some embodiments, the model training and execution system 410 of the application modernization services 102 further includes a model execution system (which may be part of or separate from the model training system), including a single physical computing device or multiple physical computing devices that are interconnected using one or more computing networks (not shown), where the physical computing device(s) host one or more virtual machine instances. The model training and execution system 410 can handle the acquisition and configuration of compute capacity (for example, containers, instances, etc.) based on requests to execute trained ML models. The model training and execution system 410 can then execute ML models using the compute capacity.

In some embodiments, a request to execute a ML model is transmitted to the model training and execution system 410, where the request includes an input to a ML model (for example, a set of input data). The model training and execution system 410 or another system executes the code in response to receiving the execution request. In particular, execution of the code causes the executable instructions in the code corresponding to the algorithm to read the model data file (e.g., model data obtained from a model data store), use the input included in the execution request as an input parameter, and generate a corresponding output. As an illustrative example, the algorithm can include coefficients, weights, layers, cluster centroids, and/or the like. The executable instructions in the code corresponding to the algorithm can read the model data file to determine values for the coefficients, weights, layers, cluster centroids, and/or the like. The executable instructions can include input parameters, and the input included in the execution request can be supplied as the input parameters. With the ML model characteristics and the input parameters provided, execution of the executable instructions can be completed resulting in an output. In some embodiments, the output is stored in a data store. Alternatively or in addition, the model training and execution system 410 transmits the output to a user device that submitted the execution request. In some embodiments, the operating environment supports many different types of machine learning models, such as classification models, multi arm bandit models, reinforcement learning models, ensemble machine learning models, deep learning models, and/or the like.

According to some embodiments, to train a ML refactoring model, an application modernization services 102 collects refactoring training data derived from portions, or "segments" or "snippets," of source code or other types of application artifacts such as bytecode, Common Intermediate Language (CIL) code, etc., known to be associated with one or more defined refactoring actions used to address an anti-pattern associated with the segments (e.g., a source code or bytecode snippet including a function that involves local database access, a class that involves the user of insecure network protocols, etc., and an associated refactoring action to address such anti-patterns). The source code or other application artifacts may be obtained, for example, from past modernization assessment processes performed by the application modernization service or other tools or from any other data sources. In some embodiments, the application modernization services 102 uses the refactoring data to train a ML model (e.g., using neural networks or other deep learning techniques) to predict refactoring actions to be used to address anti-patterns identified in other application artifact segments (e.g., to learn a correspondence between application artifact segments and semantic labels representing various different types of refactoring actions). In some embodiments, the process for training an anti-pattern detection ML model includes, for each of any number of application artifact segments in the training data, converting the segment into a graph representation of the segment (e.g., an abstract syntax tree (AST) or other graph-based representation of the segment), decomposing the graph-based representation of the segment into a collection of vectors representing syntactic paths of the segment, aggregating the vectors into a single vector representing the entire segment (e.g., where the single vector is generated based on a learned attention weighting of the syntactic path vectors), and training the model based on the obtained single vector using an error function and backpropagation techniques.

Once trained, the application modernization services 102 or other components can use the model to automatically identify refactoring suggestions in other source code when a user is modifying the source code (e.g., as auto-complete code suggestions). For example, the ML models can be used to automatically recommend refactoring actions or to assist users when manually refactoring code in a source code editor 416 (e.g., a text editor program designed to edit source code of computer programs, or an integrated development environment (IDE)). For example, in some embodiments, a modernization agent 130 (e.g., a plug-in to a source code editor or IDE) detects input associated with a portion of source code under development in a source code editor, where the source code implements a software application including at least one identified software development anti-pattern. For example, the input associated with the portion of source code can include a user selecting the portion of source code in a source code editor, providing the portion of source code as part of a request, etc. In some embodiments, the modernization agent 130 further determines, based on anti-pattern analysis results for the source code, that the portion of source code contributes to the software development anti-pattern.

In some embodiments, a graphical interface is displayed including a modernization report including an indication of one or more anti-patterns, where the indications of the anti-patterns are associated with interface elements that can be selected to navigate to a location in the source code of the corresponding application to mitigate the anti-pattern (e.g., navigate to the location of source code in a source code editor being used to develop the source code). Responsive to input received requesting to refactor the source code via such an interface element, the application modernization services 102, modernization agent 130, or source code editor causes display of the location in the source code in the source code editor for editing.

In some embodiments, a representation of the portion of source code (e.g., a vector-based representation, a graph-based representation, etc.) is provided as input to a ML model to obtain a vector or embedding representing the portion of source code, as described above. In some embodiments, the vector is used to identify one or more refactoring recommendations, where a refactoring recommendation includes a suggested modification to the portion of source code to address the software development anti-pattern (e.g., a suggested replacement, source code addition, etc.)

For example, as shown, the modernization agent 130 or modernization services 102 perform one or more optional pre-processing steps to obtain a software application's source code 116, segment the source code into code segments 402 (e.g., into segments associated with one or more identified anti-patterns), and generate vectorized representations of the segments 404. At circle "1" in FIG. 4, the vectorized segments 404 associated with the software application 400 are provided to a model training and execution system 410. In some embodiments, at circle "2," the model training execution system 410 executes one or more of the trained anti-pattern refactoring ML models (e.g., stored in a model data store 412) based on the input. In some embodiments, the model execution process is similar to the training process, where a graph-based representation of the code segments are optionally generated by the model training and execution system 410 (if not already generated by other components), and a plurality of syntactic path vectors are generated based on the graph-based representation, and a single code snippet vector is generated based embeddings derived from the syntactic path vectors and learned attention weights. In some embodiments, the code snippet vector is then used to identify a probability that the code snippet is associated with one or more known refactoring actions corresponding to the type of code snippet.

For example, in some embodiments, at circle "3," using an input source code segment, or vectorized segment derived from the source code segment, as input, the model training and execution system 410 executes a model 146 resulting in refactoring predictions 414 indicating a predicted refactoring actions associated with the source code segment. In some embodiments, the refactoring predictions 414 can be provided to a user, e.g., as part of a refactoring preview, or automatically performed by a refactoring engine 128 to modify the associated source code. In some embodiments, at least one refactoring suggestion from the one or more refactoring recommendations is displayed in association with the portion of source code (e.g., as a code autocomplete suggestion displayed in a source code editor 416. In some embodiments, selection of a refactoring recommendation causes the source code to be modified in accordance with the selected refactoring recommendation (e.g., to modifying the source code text, replace source code components with other source code components, create new source code components, etc.).

Figure 5:
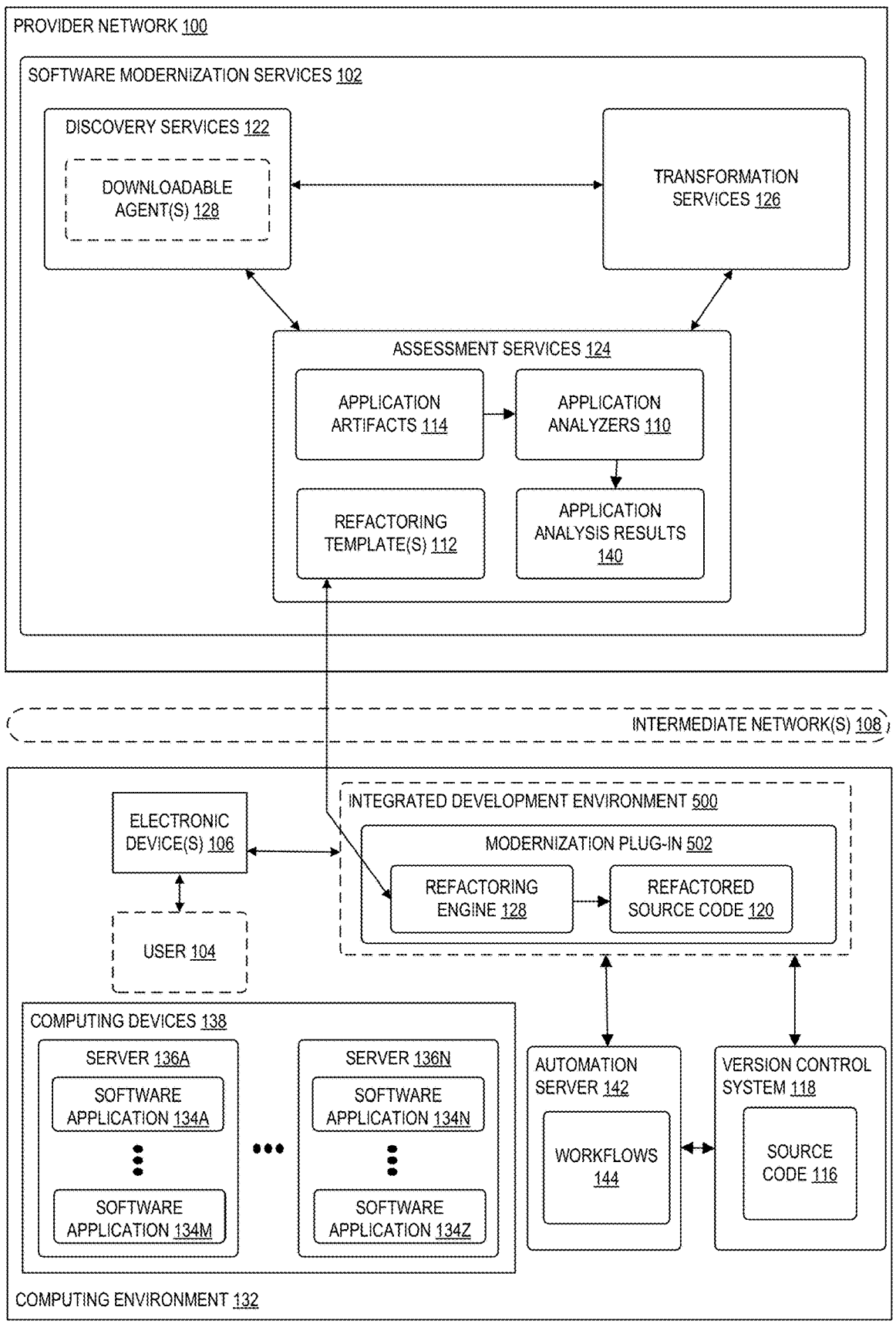
FIG. 5 is a diagram illustrating a service-oriented environment for enabling the automatic refactoring of source code to mitigate anti-patterns and other software modernization-related issues according to some embodiments.

FIG. 5 is a diagram illustrating a service-oriented environment for enabling the automatic refactoring of software application implementations source code according to some embodiments. Compared to the environment illustrated in FIG. 1, for example, the application analyzers 110 and other components of the environment are provided as services of an assessment service 124 of the cloud provider network 100. In this example, a modernization plug-in 502 is installed as part of an integrated development environment (IDE) 500 and can be used to collect application artifacts 114 and to upload the artifacts to the assessment service 124. In some embodiments, the assessment service 124 can then perform some or all of the process involved in generating application analysis results 140 using computing resources (e.g., computing resources, database resources, etc.) of the cloud provider network 100, thereby taking advantage of the performance and scalability of a cloud provider network. In some embodiments, based on anti-patterns or other modernization-related issues identified by the assessment services 124, one or more applicable refactoring templates 112 are provided to a refactoring engine 128, where the refactoring engine can then generate refactored code 120 by applying applicable refactoring rules.

Figure 6:
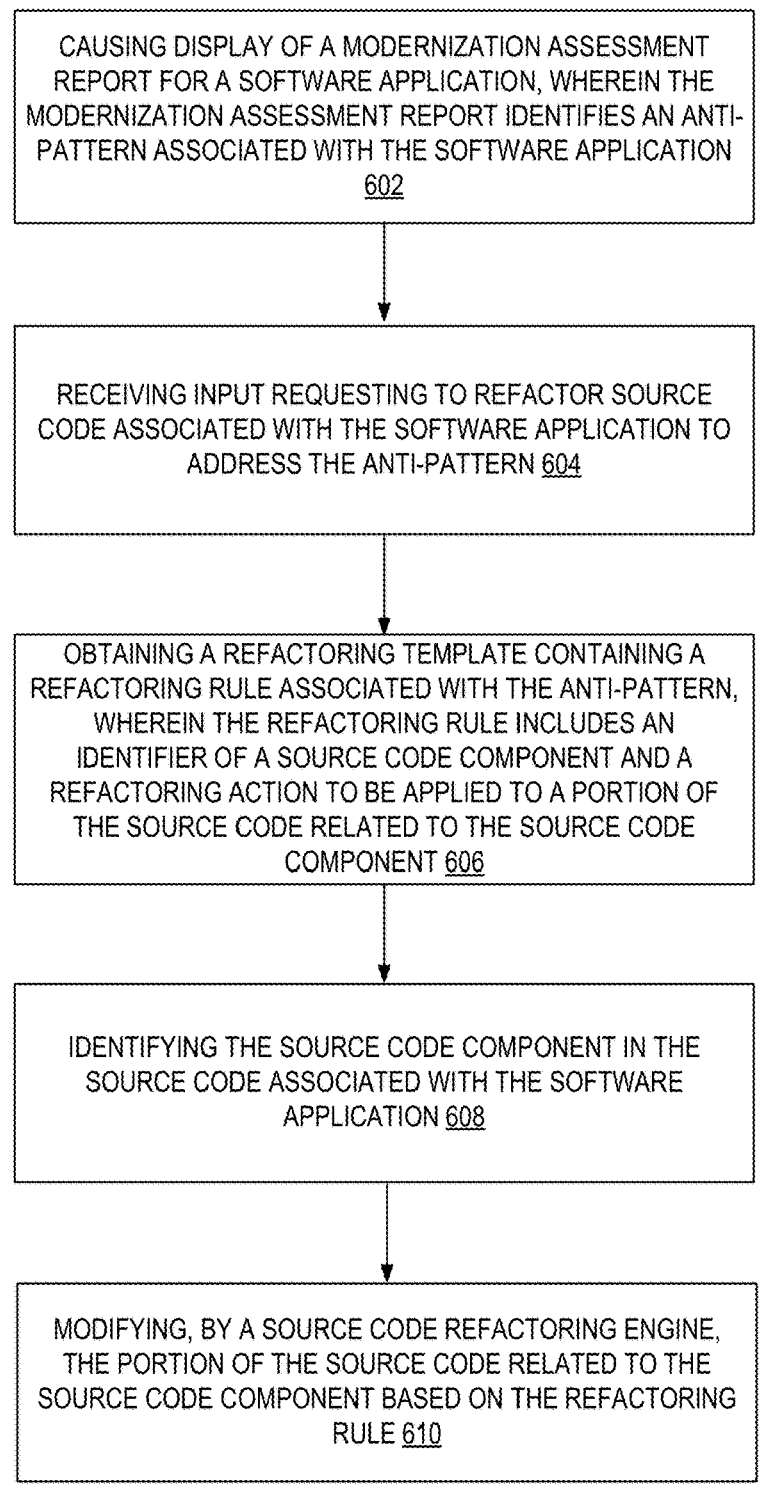
FIG. 6 is a flow diagram illustrating operations of a method for automatically refactoring software application source code to mitigate anti-patterns and other software modernization-related issues according to some embodiments.

FIG. 6 is a flow diagram illustrating operations 600 of a method for automatically refactoring software application source code to mitigate anti-patterns and other software modernization-related issues according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by software modernization services 102, a modernization agent 130, or combinations thereof of the other figures.

The operations 600 include, at block 602, causing display of a modernization assessment report for a software application, wherein the modernization assessment report identifies an anti-pattern associated with the software application.

The operations 600 further include, at block 604, receiving input requesting to refactor source code associated with the software application to address the anti-pattern.

The operations 600 further include, at block 606, obtaining a refactoring template containing a refactoring rule associated with the anti-pattern, wherein the refactoring rule includes an identifier of a source code component and a refactoring action to be applied to the source code component.

The operations 600 further include, at block 608, identifying the source code component in the source code associated with the software application.

The operations 600 further include, at block 610, modifying, by a source code refactoring engine, at least a portion of the source code component based on the refactoring rule.

In some embodiments, the portion of the implementation of the software application includes at least one of a package, a file, a class, a method, or a data object, and the refactoring action includes at least one of: modifying text associated with the portion of the implementation, deleting the portion of the implementation, creating a new source code component, or replacing the portion of the implementation with a different source code component.

In some embodiments, the operations further include causing display of information describing a modification to be made to the portion of the implementation of the software application based on the refactoring rule; and receiving input approving the modification.

In some embodiments, the operations further include identifying, by the source code refactoring engine, a component of the implementation of the software application based on the refactoring rule, wherein the component of the implementation of the software application is at least one of: a package, a file, a class, a method, a data object, a configuration file, a third party library, or documentation.

In some embodiments, the portion of the implementation of the software application is a first portion of the implementation of the software application, and wherein the refactoring rule defines a plurality of refactoring actions including the refactoring action, and the operations further include modifying, by the source code refactoring engine, one or more second portions of the implementation of the software application based on the plurality of refactoring actions.

In some embodiments, the anti-pattern is a first anti-pattern, the refactoring rule is a first refactoring rule, the portion of the implementation of the software application is a first portion of the implementation of the software application, and wherein the operations further include: identifying a second refactoring rule in the refactoring template associated with a second anti-pattern associated with the software application; identifying a second portion of the implementation of the software application associated with a second anti-pattern based on the second refactoring rule; and modifying, by the source code refactoring engine, the second portion of the implementation of the software application based on the second refactoring rule.

In some embodiments, the operations further include receiving input to load the refactoring template into the source code refactoring engine, wherein the refactoring template includes at least one user-generated refactoring rule.

In some embodiments, the source code refactoring engine is part of a plug-in to an integrated development environment (IDE) used to develop the source code associated with the software application.

In some embodiments, obtaining the refactoring template includes sending, to a modernization service of a cloud provider network, an application programming interface (API) request to obtain the refactoring template, and wherein the modernization service sends the refactoring template to a software agent running in a user computing environment and that includes the source code refactoring engine.

In some embodiments, the operations further include causing display of a graphical interface including a modernization report including an indication of the anti-pattern, wherein the indication of the anti-pattern is associated with an interface element that can be selected to request refactoring of the source code to mitigate the anti-pattern; and receiving input requesting to refactor the source code to mitigate the anti-pattern via the interface element.

In some embodiments, the operations further include obtaining, by a modernization service of a cloud provider network, application artifacts associated with the software application, wherein the application artifacts include at least one of: source code, bytecode, or intermediate language files; analyzing, using computing resources provisioned by the cloud provider network, the application artifacts to generate at least one of: application profile data, a graph model of dependencies associated with the software application, a plurality of proposed subunits of the software application, a plurality of anti-patterns including the anti-pattern; and sending, to a modernization agent, the refactoring template, wherein the refactoring template includes the refactoring rule associated with the anti-pattern.

Figure 7:
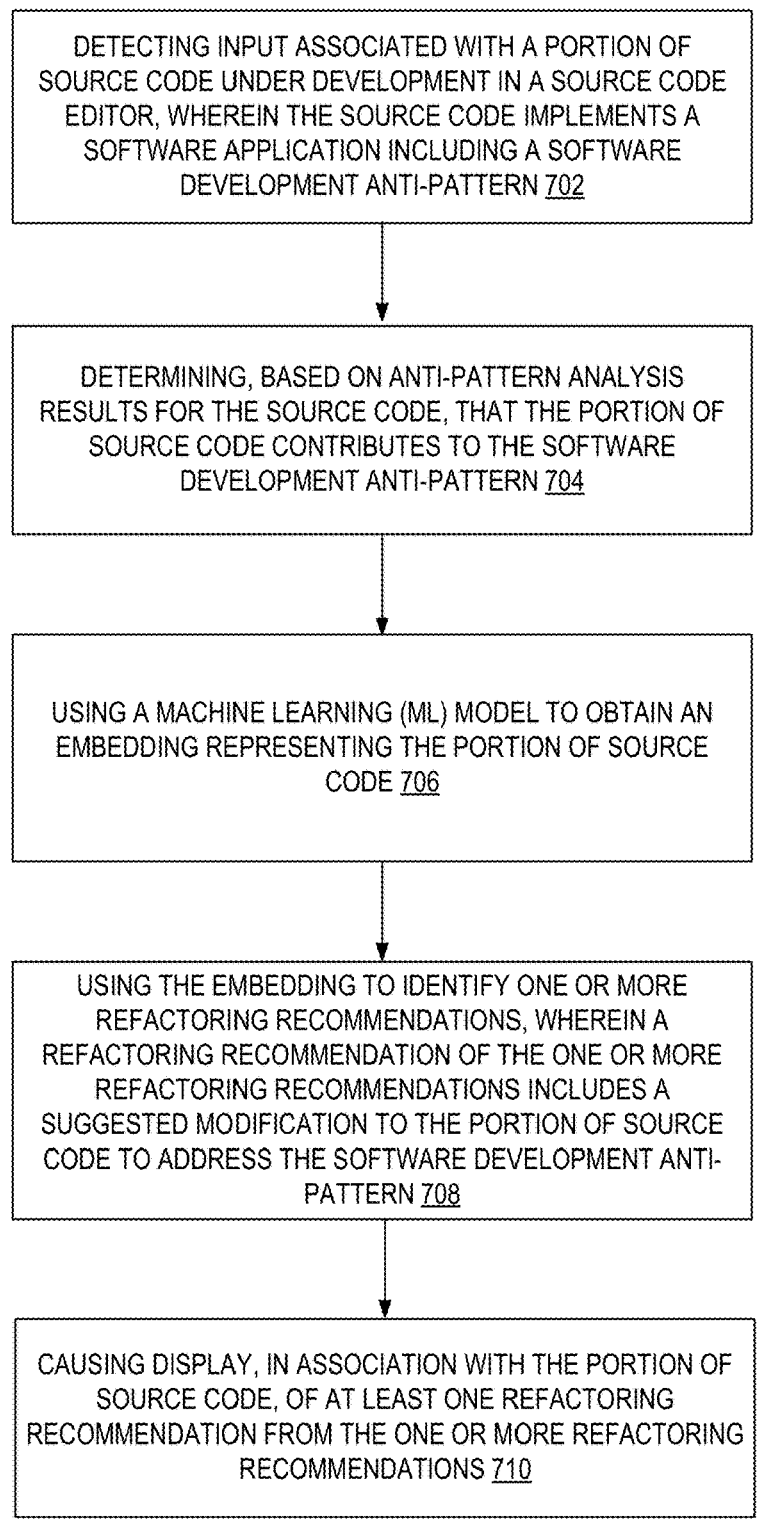
FIG. 7 is a flow diagram illustrating operations of a method for enabling ML-assisted refactoring of software application source code to mitigate anti-patterns and other software modernization-related issues according to some embodiments.

FIG. 7 is a flow diagram illustrating operations 700 of a method for enabling ML-assisted refactoring of software application source code to mitigate anti-patterns and other software modernization-related issues according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by software modernization services 102, a modernization agent 130, or combinations thereof of the other figures.

The operations 700 include, at block 702, detecting input associated with a portion of source code under development in a source code editor, wherein the source code implements a software application including a software development anti-pattern.

The operations 700 further include, at block 704, determining, based on anti-pattern analysis results for the source code, that the portion of source code contributes to the software development anti-pattern.

The operations 700 further include, at block 706, using a machine learning (ML) model to obtain an embedding representing the portion of source code.

The operations 700 further include, at block 708, using the embedding to identify one or more refactoring recommendations, wherein a refactoring recommendation of the one or more refactoring recommendations includes a suggested modification to the portion of source code to address the software development anti-pattern.

The operations 700 further include, at block 710, causing display, in association with the portion of source code, of at least one refactoring recommendation from the one or more refactoring recommendations.

In some embodiments, the source code associated with the software development anti-pattern is first source code associated with a first software development anti-pattern, and wherein the operations further include: obtaining second source code including a second software development anti-pattern; obtaining a refactored version of the second source code, wherein the refactored version of the second source code includes a modified portion of source code used to address the software development anti-pattern; generating refactoring training data including one or more embeddings representing the second source code and a label corresponding to a refactoring action used to modify the modified portion of the source code; and using the refactoring training data to further train the ML model.

In some embodiments, the operations further include receiving input, in a source code editor, selecting a refactoring suggestion from the one or more refactoring suggestions; and modifying the source code according to the refactoring suggestion.

In some embodiments, the operations further include determining, based on anti-pattern analysis results for the source code, that the portion of source code is associated with the software development anti-pattern.

In some embodiments, the portion of source code is a first portion of the source code, and the refactoring recommendation is associated with a plurality of refactoring actions, and wherein the operations further include modifying a plurality of portions of the source code based on the plurality of refactoring actions.

In some embodiments, the anti-pattern is a first anti-pattern, the portion of the source code is a first portion of source code, and wherein the operations further include: detecting input identifying a second portion of source code associated with a second software development anti-pattern; using a second vector-based representation of the second portion of source code as input to the ML model to obtain a vector representing the second portion of source code; using the vector to identify one or more second refactoring recommendations, wherein a refactoring recommendation of the one or more second refactoring recommendations includes a suggested modification to the second portion of source code; and causing display of at least one refactoring recommendation from the one or more second refactoring recommendations.

In some embodiments, the software development anti-pattern is a first software development anti-pattern, the portion of the source code is a first portion of source code, and the operations further include: obtaining a refactoring template including a refactoring rule associated with a second software development anti-pattern, wherein the refactoring rule defines a refactoring action to be applied to a portion of the source code; and modifying, by a source code refactoring engine, the portion of the source code based on the refactoring action.

In some embodiments, wherein using the vector to identify the one or more refactoring recommendations is performed by a plug-in to a source code editor, and wherein the source code editor is used to develop the source code.

In some embodiments, the operations further include receiving, by a modernization service of a cloud provider network, a request identifying the portion of source code, wherein the modernization service provisions computing resources used to identify the one or more refactoring recommendations and to send the one or more refactoring recommendations to a plug-in to a source code editor, and wherein the source code editor is used to develop the source code associated with the software application.

In some embodiments, the operations further include causing display of a graphical interface including a modernization report including an indication of the anti-pattern, wherein the indication of the anti-pattern is associated with an interface element that can be selected to navigate to a location in the source code to mitigate the anti-pattern; receiving input requesting to refactor the source code to mitigate the anti-pattern via the interface element; and causing display of the location in the source code in a source code editor.

In some embodiments, the operations further include obtaining, by a modernization service of a cloud provider network, application artifacts associated with a software application implemented by the source code, wherein the application artifacts include at least one of: source code, bytecode, or intermediate language files; and analyzing, using computing resources provisioned by the cloud provider network, the application artifacts to generate at least one of: application profile data, a graph model of dependencies associated with the software application, a plurality of proposed subunits of the software application, a plurality of anti-patterns including the anti-pattern.

In some embodiments, the ML model is a first ML model, and operations further include: using the embedding as input a second ML model to identify a label indicating the software development anti-pattern, wherein the software development anti-pattern is associated with the one or more refactoring recommendations.

Figure 8:
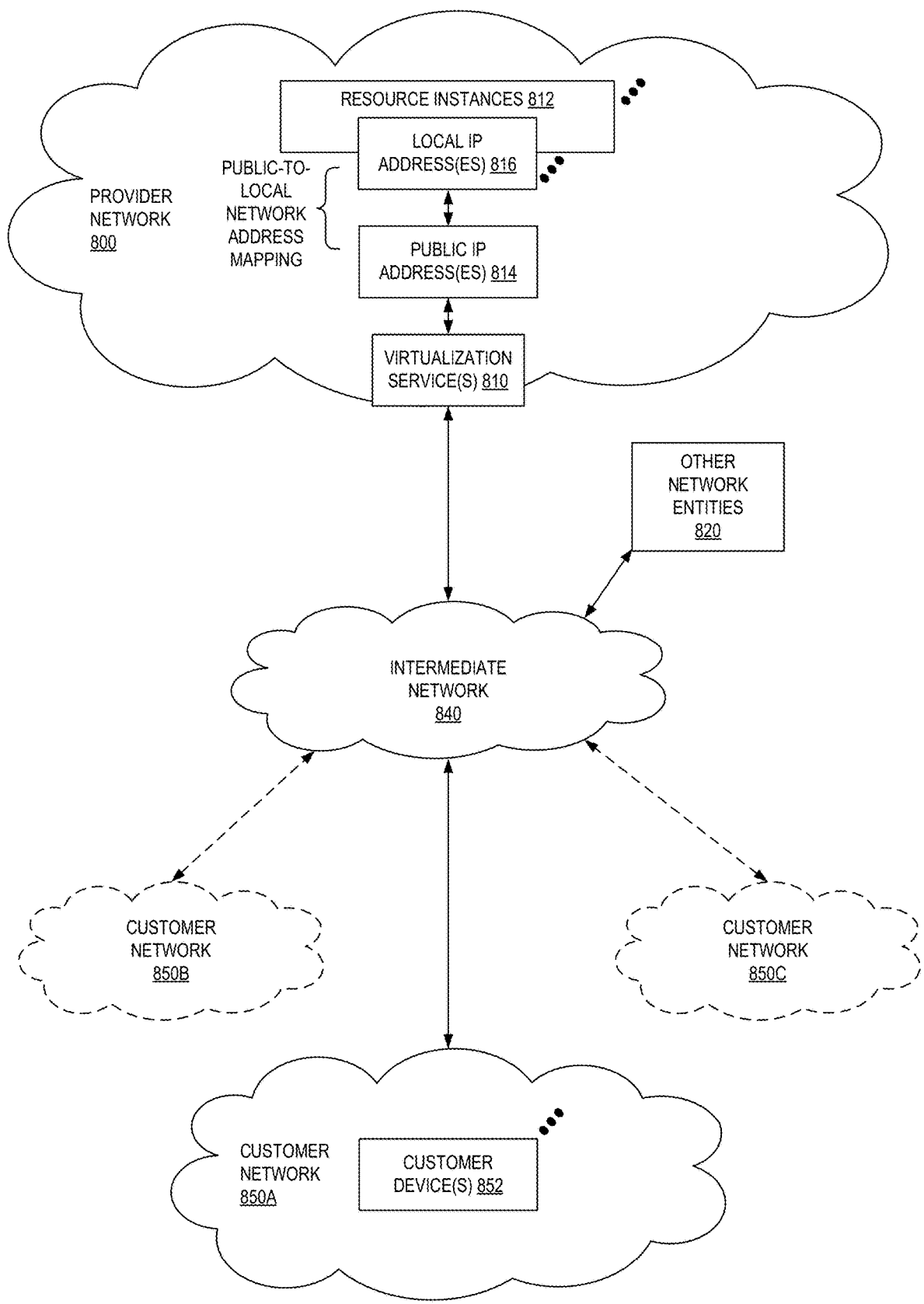
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses.

Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
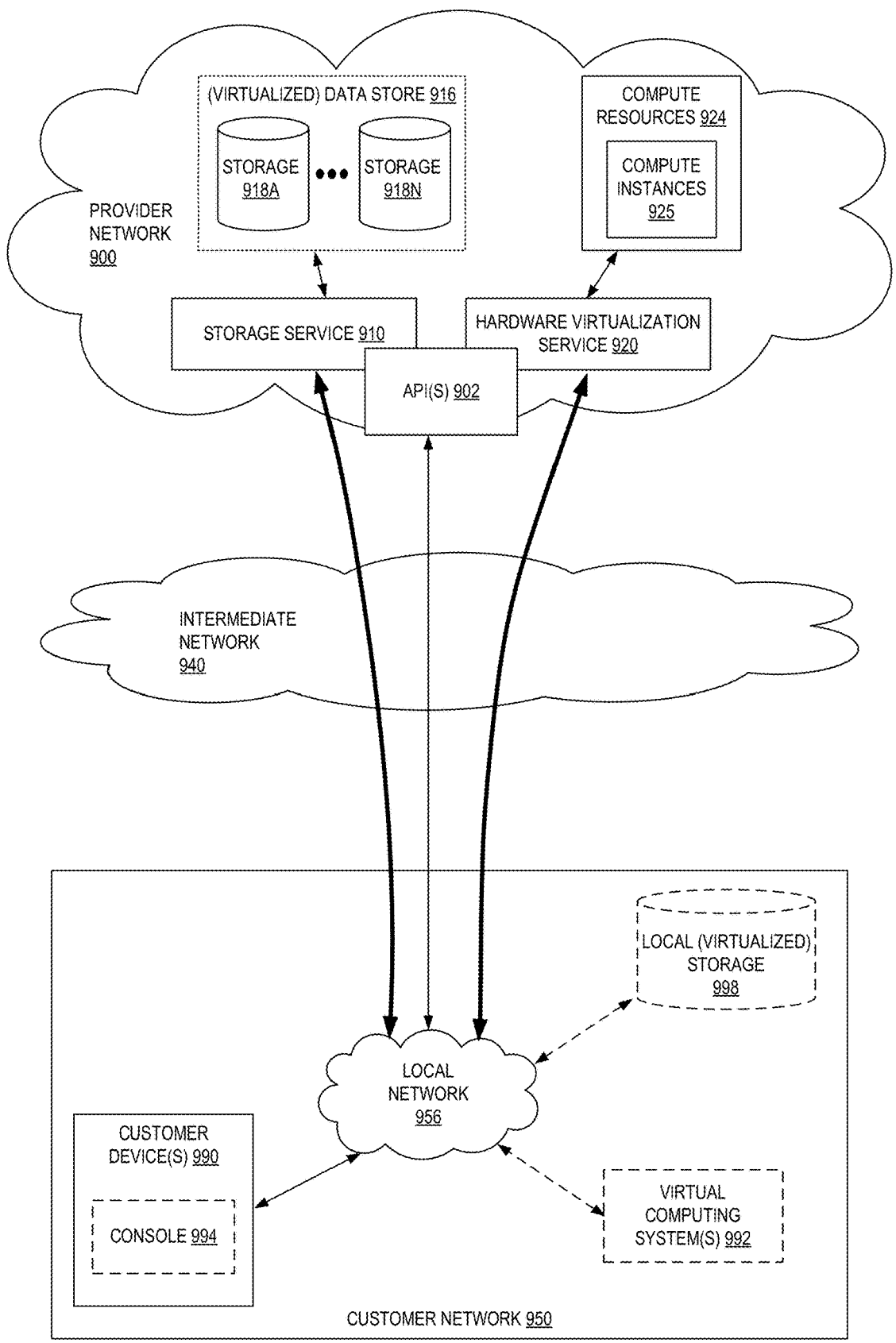
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple compute resources 924 (e.g., compute instances 925 such as VMs) to customers. The compute resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the compute resources 924 to public Internet destinations, and from public Internet sources to the local IP addresses of compute resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
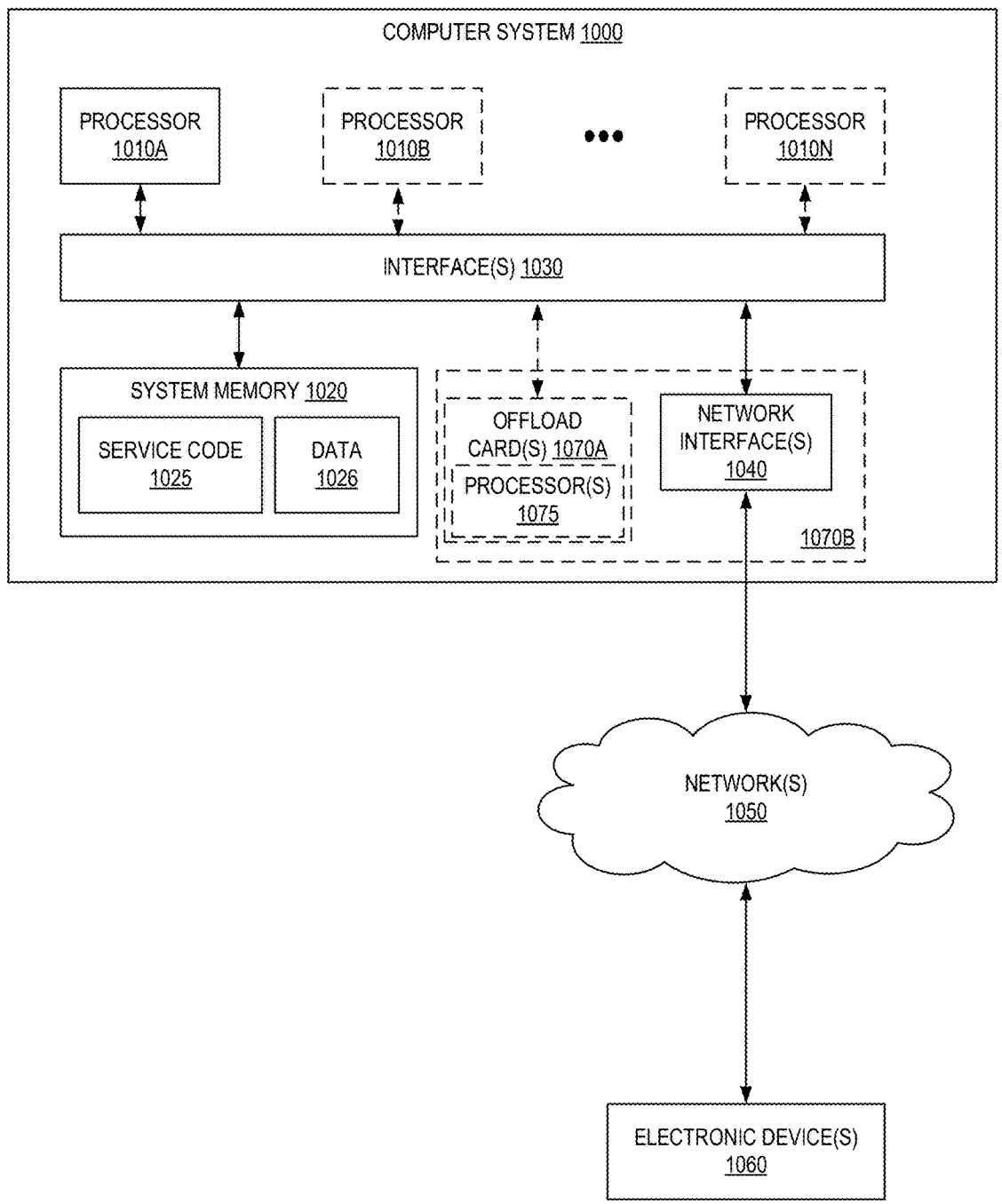
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as service code 1025 (e.g., executable to implement, in whole or in part, the modernization services 102) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070A or 1070B (including one or more processors 1075, and possibly including the one or more network interfaces 1040) that are connected using an I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations such as pausing and/or un-pausing compute instances, launching and/or terminating compute instances, performing memory transfer/copying operations, etc. These management operations may, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   causing display of a modernization assessment report for a software application, wherein the modernization assessment report identifies a first cloud anti-pattern associated with the software application;
   receiving input requesting to refactor a portion of a first source code associated with the software application to address the first cloud anti-pattern;
   using a machine learning model to obtain a first embedding representing the portion of the first source code; wherein the first embedding comprises a vector representing the portion of the first source code;
   using the first embedding to identify a first refactoring action to be applied to a first source code component in the portion of the first source code; wherein using the first embedding comprises comparing for similarity the first embedding representing the portion of the first source code to an embedding associated with the first refactoring action;
   modifying, by a source code refactoring engine, the first source code component in the portion of the first source code according to the first refactoring action;
   obtaining a second source code including a second cloud anti-pattern;
   obtaining a refactored version of the second source code, wherein the refactored version of the second source code includes a modified portion of the second source code used to address the second cloud anti-pattern;

generating refactoring training data including one or more embeddings representing the second source code and a label corresponding to a second refactoring action used to modify the modified portion of the second source code; and using the refactoring training data to further train the machine learning model.

2. The computer-implemented method of claim 1, wherein the first source code component includes at least one of a package, a file, a class, a method, or a data object; and wherein the first refactoring action includes at least one of: modifying text associated with the portion of the first source code, deleting the portion of the first source code, creating a new source code component, or replacing the first source code component with a different source code component.

3. The computer-implemented method of claim 1, further comprising:
causing display of information describing a modification to be made to the first source code component; and
receiving input approving the modification.

4. A computer-implemented method comprising:
receiving input requesting to refactor a portion of a first source code of a software application to address a first cloud anti-pattern associated with the software application;
using a machine learning model to obtain a first embedding representing the portion of the first source code; wherein the first embedding comprises a vector representing the portion of the first source code;
using the first embedding to identify a first refactoring action to be applied to a first source code component in the portion of the first source code of the software application; wherein using the first embedding comprises comparing for similarity the first embedding representing the portion of the first source code to an embedding associated with the first refactoring action;
modifying, by a source code refactoring engine, the first source code component in the portion of the first source code of the software application based on the first refactoring action;
obtaining a second source code including a second cloud anti-pattern;
obtaining a refactored version of the second source code, wherein the refactored version of the second source code includes a modified portion of the second source code used to address the second cloud anti-pattern;
generating refactoring training data including one or more embeddings representing the second source code and a label corresponding to a second refactoring action used to modify the modified portion of the second source code; and
using the refactoring training data to further train the machine learning model.

5. The computer-implemented method of claim 4, wherein the portion of the first source code of the software application includes at least one of a package, a file, a class, a method, or a data object; and wherein the first refactoring action includes at least one of:
modifying text associated with the portion of the first source code, deleting the portion of the first source code, creating a new source code component, or replacing the portion of the first source code with a different source code component.

6. The computer-implemented method of claim 4, further comprising:
causing display of information describing a modification to be made to the portion of the first source code of the software application; and
receiving input approving the modification.

7. The computer-implemented method of claim 4, further comprising identifying, by the source code refactoring engine, a component of the first source code of the software application, wherein the component of the first source code of the software application is at least one of: a package, a file, a class, a method, a data object, a configuration file, a third-party library, or documentation.

8. The computer-implemented method of claim 4, wherein the portion of the first source code of the software application is a first portion of the first source code of the software application and wherein the method further comprises modifying, by the source code refactoring engine, one or more second portions of the first source code of the software application based on the first refactoring action.

9. The computer-implemented method of claim 4, wherein the first cloud anti-pattern is a first cloud anti-pattern, the portion of the first source code of the software application is a first portion of the first source code of the software application, and wherein the method further comprises:
identifying a second portion of the first source code of the software application associated with a second cloud anti-pattern; and
modifying, by the source code refactoring engine, the second portion of the first source code of the software application.

10. The computer-implemented method of claim 4, wherein the source code refactoring engine is part of a plug-in to an integrated development environment (IDE) used to develop the first source code associated with the software application.

11. The computer-implemented method of claim 4, further comprising:
causing display of a graphical interface including a modernization report including an indication of the first cloud anti-pattern, wherein the indication of the first cloud anti-pattern is associated with an interface element that can be selected to request refactoring of the first source code to mitigate the first cloud anti-pattern; and
receiving input requesting to refactor the first source code to mitigate the first cloud anti-pattern via the interface element.

12. The computer-implemented method of claim 4, further comprising:
obtaining, by a modernization service of a cloud provider network, application artifacts associated with the software application, wherein the application artifacts include at least one of: source code, bytecode, or intermediate language files; and
analyzing, using computing resources provisioned by the cloud provider network, the application artifacts to generate at least one of: application profile data, a graph model of dependencies associated with the software application, a plurality of proposed subunits of the software application, a plurality of cloud anti-patterns including the first cloud anti-pattern.

13. A system comprising:
a first one or more electronic devices to implement a modernization service in a cloud provider network, wherein the modernization service includes instructions that upon execution cause the modernization service to:
- cause display of a modernization assessment report for a software application, wherein the modernization assessment report identifies a first cloud anti-pattern associated with the software application,
- receive input requesting to refactor a portion of a first source code associated with the software application to address the first cloud anti-pattern,
- use a machine learning model to obtain a first embedding representing the portion of the first source code, the first embedding comprising a vector representing the portion of the first source code,
- use the first embedding to identify a first refactoring action to be applied to a first source code component in a portion of the first source code by comparing for similarity the first embedding representing the portion of the first source code to an embedding associated with the first refactoring action, and
- modify, by a source code refactoring engine, the first source code component in the portion of the first source code based on the first refactoring action; and a second one or more electronic devices to implement a modernization agent, wherein the modernization agent including instructions that upon execution cause the modernization agent to:
- obtain application artifacts associated with the software application from a user's computing environment, wherein the application artifacts include the first source code;
- send the application artifacts to the modernization service;
- obtain a second source code including a second cloud anti-pattern;
- obtain a refactored version of the second source code, wherein the refactored version of the second source code includes a modified portion of the second source code used to address the second cloud anti-pattern;
- generate refactoring training data including one or more embeddings representing the second source code and a label corresponding to a second refactoring action used to modify the modified portion of the second source code; and
- use the refactoring training data to further train the machine learning model.

14. The system of claim 13, wherein the first source code component includes at least one of a package, a file, a class, a method, or a data object; and wherein the first refactoring action includes at least one of: modifying text associated with the portion of the first source code, deleting the portion of the first source code, creating a new source code component, or replacing the first source code component with a different source code component.

15. The system of claim 13, wherein the instructions, upon execution, further cause the modernization service to:
- cause display of information describing a modification to be made to the first source code component; and
- receive input approving the modification.

16. The system of claim 13, wherein the portion of the first source code is a first portion of the first source code and wherein the instructions, upon execution, further cause the modernization service to modify, by the source code refactoring engine, one or more second portions of the first source code.

17. The system of claim 13, wherein the first cloud anti-pattern is a first cloud anti-pattern, the first source code component is a first component, the portion of the first source code is a first portion of the first source code, and wherein the instructions, upon execution, further cause the modernization service to:
- identify a second component of the first source code associated with a second cloud anti-pattern; and
- modify, by the source code refactoring engine, a second portion of the first source code associated with the second component of the software application.

18. The computer-implemented method of claim 4, wherein the machine learning model is a first machine learning model, and wherein the method further comprises:
- using the first embedding as input a second machine learning model to identify a label indicating the first cloud anti-pattern, wherein the first cloud anti-pattern is associated with the first refactoring action.

\* \* \* \* \*